US009820289B1

(12) United States Patent
Pawar et al.

(10) Patent No.: US 9,820,289 B1
(45) Date of Patent: Nov. 14, 2017

(54) METHOD AND SYSTEM FOR MANAGING QUANTITY OF CARRIERS IN AIR INTERFACE CONNECTION BASED ON TYPE OF CONTENT

(71) Applicant: Sprint Spectrum L.P., Overland Park, KS (US)

(72) Inventors: Hemanth B. Pawar, Brambleton, VA (US); Shilpa Kowdley Srinivas, Brambleton, VA (US); Krishna Sitaram, Chantilly, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 102 days.

(21) Appl. No.: 14/575,455

(22) Filed: Dec. 18, 2014

(51) Int. Cl.
*H04J 3/17* (2006.01)
*H04W 72/08* (2009.01)
*H04L 5/14* (2006.01)

(52) U.S. Cl.
CPC ............ *H04W 72/085* (2013.01); *H04L 5/14* (2013.01)

(58) Field of Classification Search
CPC ............. H04L 5/0098; H04W 72/005; H04W 72/0046; H04W 72/048; H04W 72/0453
USPC .................................. 370/252, 310–350, 433
See application file for complete search history.

(56) References Cited

U.S. PATENT DOCUMENTS

| 5,583,869 A | 12/1996 | Grube et al. |
| 6,721,569 B1 | 4/2004 | Hashem et al. |
| 9,107,200 B1 | 8/2015 | Naim et al. |
| 2006/0221939 A1 | 10/2006 | Rosen et al. |
| 2006/0233188 A1 | 10/2006 | Oliver et al. |
| 2008/0013480 A1 | 1/2008 | Kapoor et al. |
| 2008/0254833 A1 | 10/2008 | Keevill et al. |
| 2010/0093281 A1 | 4/2010 | Khanka et al. |
| 2010/0309930 A1* | 12/2010 | Harrison ............. H04L 12/4633 370/474 |
| 2012/0252477 A1 | 10/2012 | Rao |
| 2012/0281536 A1 | 11/2012 | Gell et al. |
| 2012/0282942 A1 | 11/2012 | Uusitalo et al. |

(Continued)

FOREIGN PATENT DOCUMENTS

EP    2 385 653 A2    9/2011

OTHER PUBLICATIONS

U.S. Appl. No. 14/507,128, filed Oct. 6, 2014.

(Continued)

*Primary Examiner* — Ricky Ngo
*Assistant Examiner* — Wei-Po Kao

(57) ABSTRACT

A method and system for managing quantity of carriers to aggregate together in carrier aggregation service, based at least in part on consideration of the type of content that will be communicated to or from the user equipment device (UE) at issue. A base station serving the UE may determine a type of content that will be communicated between the base station and the UE and, based at least on the determined type of content, may decide whether to apply carrier aggregation and, when the decision is to apply carrier aggregation, determine, based at least on the determined type of content, how many component carriers to aggregate together in the carrier aggregation service of the UE. The base station may then modify an air interface connection with the UE to encompass the determined number of component carriers.

16 Claims, 4 Drawing Sheets

(56) References Cited

U.S. PATENT DOCUMENTS

| | | |
|---|---|---|
| 2013/0010709 A1 | 1/2013 | Earnshaw et al. |
| 2013/0010711 A1 | 1/2013 | Larsson et al. |
| 2013/0039302 A1* | 2/2013 | Miki .................... H04L 5/001 |
| | | 370/329 |
| 2013/0083661 A1 | 4/2013 | Gupta et al. |
| 2013/0109372 A1 | 5/2013 | Ekici |
| 2014/0170990 A1 | 6/2014 | Black et al. |
| 2015/0063151 A1 | 3/2015 | Sadek et al. |
| 2015/0135241 A1* | 5/2015 | Stoller .............. H04N 21/4755 |
| | | 725/92 |
| 2015/0305011 A1* | 10/2015 | Bergstrom ........ H04W 72/0453 |
| | | 370/329 |

OTHER PUBLICATIONS

U.S. Appl. No. 14/575,455, filed Dec. 18, 2014.
"Carrier Aggregation—Activation and Deactivation of Secondary Calls," How LTE Stuff Works, printed from the World Wide Web, dated Oct. 17, 2014.
Office Action from U.S. Appl. No. 14/575,428, dated Apr. 24, 2017.
U.S. Appl. No. 14/575,428, filed Dec. 18, 2014.
First Action Interview Pilot Program Pre-Interview Communication from U.S. Appl. No. 14/575,428, dated Dec. 16, 2016.
First Action Interview Pilot Program Pre-Interview Communication from U.S. Appl. No. 15/063,758, dated Sep. 14, 2017.

* cited by examiner

METHOD AND SYSTEM FOR MANAGING QUANTITY OF CARRIERS IN AIR INTERFACE CONNECTION BASED ON TYPE OF CONTENT

BACKGROUND

In a wireless communication system, a base station may provide one or more coverage areas, such as cells or sectors, in which the base station may serve user equipment devices (UEs), such as cell phones, wirelessly-equipped personal computers or tablets, tracking devices, embedded wireless communication modules, or other devices equipped with wireless communication functionality (whether or not operated by a human user). In general, each coverage area may operate on one or more carriers each defining one or more ranges of frequency spectrum and having a respective "downlink channel" for carrying communications from the base station to UEs and a respective "uplink channel" for carrying communications from the UEs to the base station. Such carriers may be frequency division duplex (FDD), in which the downlink and uplink channels are defined as separate respective ranges of frequency, or time division duplex (TDD), in which the downlink and uplink channels are defined on a common range of frequency but distinguished through time division multiplexing. Further, the downlink channel and uplink channel of each carrier may also be divided into respective sub-channels for carrying particular communications, such as one or more control channels for carrying control signaling and one or more traffic channels for carrying application-layer data and other traffic.

For instance, in a system operating according to an orthogonal frequency division multiple access (OFDMA) protocol, such as the Long Term Evolution (LTE) standard of the Universal Mobile Telecommunications System (UMTS) for example, the air interface is divided over time into frames and sub-frames each defining two slots, and the uplink and downlink channels are each divided over their frequency bandwidth into sub-carriers that are grouped within each slot into resource blocks. When a UE is positioned within coverage of a base station in such a system, the UE may register or "attach" with the base station on a particular carrier on which the base station is configured to provide, and the base station then schedule particular downlink and uplink resource blocks on that carrier to carry data communications to and from the UE. Further, the base station and UE may modulate their air interface data communications at a coding rate selected based on quality of the UE's coverage, such as with higher rate coding rate when the UE is in better coverage of the base station and with a lower coding rate when the UE is in worse coverage of the base station.

In such an LTE system, for instance, when the base station has data to transmit to a UE, the base station may assign certain downlink resource blocks (and thus certain sub-carriers) in a given sub-frame for use to carry the data to the UE at a particular coding rate, and the base station may then (i) transmit to the UE in that sub-frame a downlink control information (DCI) message that specifies the assigned resource blocks and coding rate and (ii) encode and transmit the data to the UE in the assigned resource blocks in that sub-frame. Per the DCI message, the UE would then read the transmitted data from the assigned resource blocks. Likewise, when the UE has data to transmit to the base station and accordingly transmits a scheduling request to the base station, the base station may assign certain uplink resource blocks in a given sub-frame for use to carry the data from the UE at a particular coding rate and may transmit to the UE, in advance of that sub-frame, a DCI message that specifies the assigned resource blocks and coding rate. And the UE may then encode and transmit the data to the base station in the assigned resource blocks in that sub-frame.

With such an arrangement, the bandwidth of the carrier on which the base station serves a UE may pose an effective limit on the peak rate of data communication between the base station and the UE, as the bandwidth would define only a limited number of resource blocks per slot, with data rate per resource block being further limited based on air interface conditions. By way of example, in accordance with the LTE standard, a TDD carrier may be up to 20 MHz wide. Depending on the TDD frame format (e.g., how many sub-frames per frame are used for downlink versus uplink) and other factors, such a carrier may accommodate peak downlink data rate of only about 60 megabits per second (Mbps).

One way to help overcome this per-carrier data rate limitation is to have a base station serve a UE on multiple carriers at once, providing what is known as "carrier aggregation" service. With carrier aggregation service, multiple carriers from either contiguous frequency bands or non-contiguous frequency bands are aggregated together as "component carriers" to increase the overall bandwidth available per slot by providing a greater extent of air interface resources in which the base station can schedule uplink and downlink communication. For instance, if a base station serves a UE on two 20 MHz TDD LTE carriers at once, the peak throughput may be about 120 Mbps. And if the base station serves a UE on three 20 MHz TDD LTE carriers at once, the peak throughput may be as high as 180 Mbps. With carrier aggregation, one of the carriers may be deemed to be a primary carrier or primary cell (PCell) and each other carrier may be deemed to be a secondary carrier or secondary cell (SCell).

Overview

Although serving a UE on multiple carriers concurrently can help improve throughput for the UE, doing so also necessarily makes use of more radio frequency spectrum than serving the UE on just one of the carriers at a time. In practice, the operator of a wireless communication system may have only a limited extent of radio frequency spectrum, such as a limited number of licensed carriers, available for use to serve UEs in a given market. Providing UEs with carrier aggregation service in such a system may thus consume more of that limited radio frequency spectrum than providing UEs with service on just one carrier at a time and may thereby leave less spectrum available to serve other UEs. Further, the more carriers the operator aggregates together for concurrent use to serve a UE, the more significant this issue may become.

Consequently, it would be desirable to manage use of carriers, and particularly to manage when to apply carrier aggregation and, when providing a UE with carrier aggregation service, to manage how many carriers to aggregate together (e.g., whether to aggregate together just two carriers or perhaps three or more carriers). Disclosed herein is a method and system for doing so, based at least in part on consideration of the type of content that will be communicated to or from the UE. In particular, the disclosure provides for determining a type of content that will be communicated between the base station and the UE and, based at least on the determined type of content, deciding whether to apply carrier aggregation and, when the decision is to apply carrier aggregation, determining, based at least on the determined type of content, how many component carriers to aggregate together in the carrier aggregation service of the UE. The disclosure then provides for modifying an air interface connection between the base station and the UE to encompass the determined number of component carriers, such as by adding or removing one or more carriers to cause the air interface to encompass the determined number of carriers.

Accordingly, in one respect, disclosed herein is a method for managing carriers such as those noted above for instance, while a base station is serving a UE through an air interface connection between the base station and the UE. As disclosed, the method involves determining a type of content that will be transmitted between the base station and the UE. Further, the method involves, based at least on the determined type of content that will be transmitted between the base station and the UE, (i) making a decision that the base station should serve the UE with carrier aggregation and (ii) making a determination of a quantity of component carriers to aggregate together in the carrier aggregation, the quantity being at least two. And the method involves, responsive to the decision that the base station should serve the UE with carrier aggregation, modifying the air interface connection between the base station and the UE to encompass the determined quantity of component carriers.

By way of example, if the base station is initially serving the UE on just a single carrier or with carrier aggregation on multiple carriers, the base station or another network node may engage in deep packet inspection to evaluate data within one or more data packets flowing to or from the UE so as to determine a type of content that will be communicated between the base station and the UE. Further, the base station or other network node may then correlate that determined type of content with a decision of whether or not to apply carrier aggregation. And when the decision is to apply carrier aggregation, the base station or other network node may further correlate the determined type of content with a quantity of component carriers to aggregate together in the carrier aggregation service, which may be a different quantity than the air interface connection between the base station and the UE encompassed.

Based on that analysis, the base station may then modify the air interface connection by effectively preparing the base station and UE to communicate with each other on the determined quantity of component carriers. For instance, the base station may transmit to the UE a radio-resource-control configuration message that specifies the component carriers on which the base station will be providing the UE with carrier aggregation service, and the base station may update a UE context record at the base station to indicate that the air interface connection now encompasses the specified component carriers. The base station may then provide the UE with carrier aggregation service on the specified quantity of component carriers.

In another respect, disclosed is a method operable by a base station that has an established radio-link-layer connection with a UE served by the base station. According to the method, the base station determines a type of content that will be transmitted between the UE and the base station. Further, based at least on the determined type of content that will be transmitted between the UE and the base station, the base station determines a quantity of component carriers on which to serve the UE with carrier aggregation (e.g., whether to serve the UE with carrier aggregation on two component carriers, on three component carriers, or on some other quantity of component carriers that is two or more). In turn, the base station then modifies the radio-link-layer connection to encompass the determined quantity of component carriers, such as by adding one or more carriers to or taking away one or more carriers from the radio-link-layer connection so as to result in the radio-link-layer connection encompassing the determined quantity of carriers.

Still further, in another respect, disclosed is a base station configured to carry out some or all of the operations noted above. In an example arrangement, for instance, the base station includes an antenna structure for communicating over a radio-frequency air interface, and the base station includes a controller configured to manage communication via the antenna structure over the air interface. In that arrangement, the controller may then be configured to (i) identify a type of content that will be communicated between the base station and a UE served by the base station, (ii) make a decision based at least on the determined type of content that the base station should serve the UE with carrier aggregation, (iii) make a determination, based at least on the identified type of content, of a quantity of component carriers on which the base station should serve the UE with the carrier aggregation, and (iv) responsive to the decision and determination, modify a radio-link-layer connection between the base station and the UE to encompass the determined quantity of component carriers.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
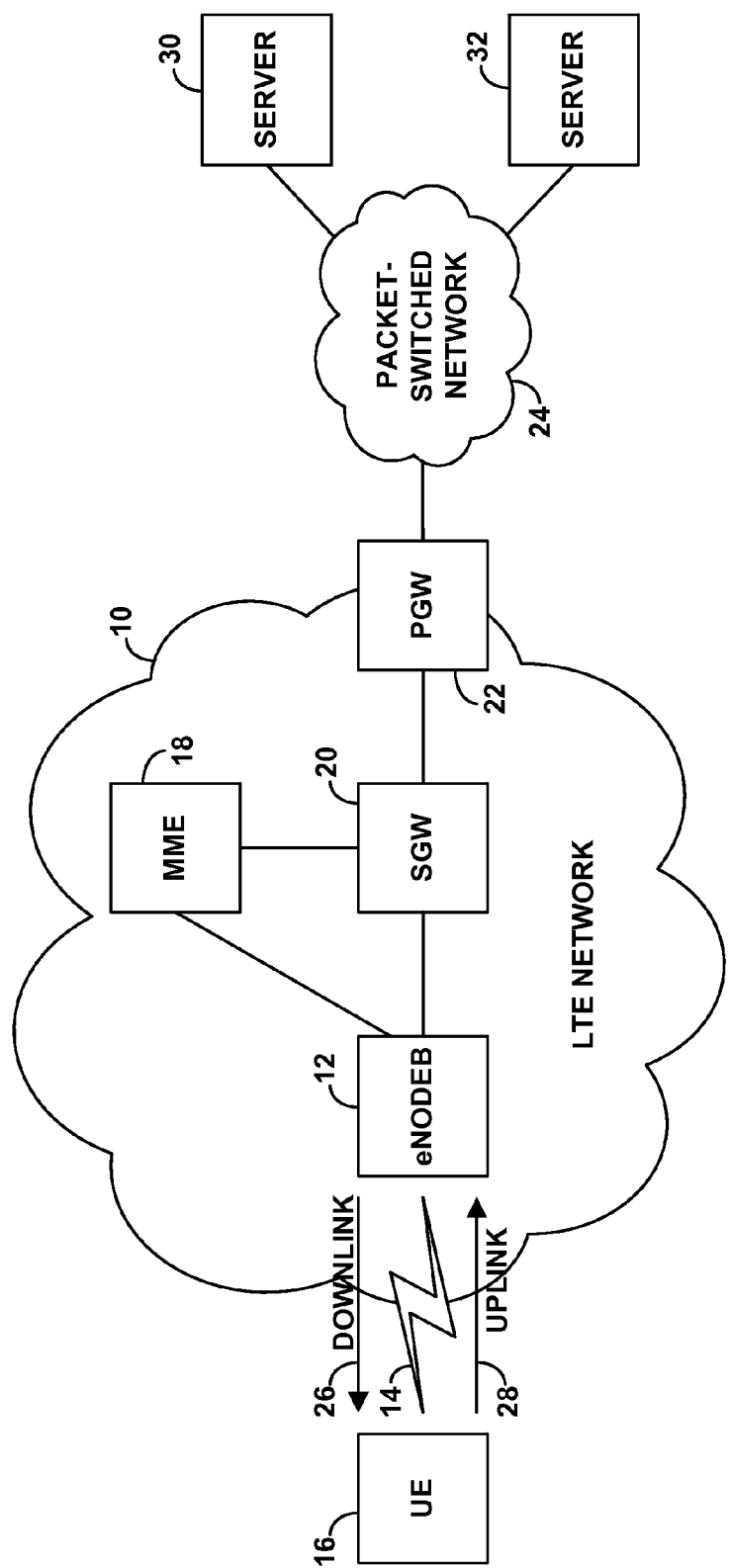
FIG. 1 is a simplified block diagram of a wireless communication system in which the present method and system can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve UEs with wireless packet data communication service, including possibly voice-over-packet service, but may also provide other functions. As shown, the LTE network includes a base station (eNodeB) 12, which has an antenna structure and associated equipment for providing an LTE coverage area 14 in which to serve UEs such as an example UE 16 as shown. The eNodeB 12 then has a communication interface with a mobility management entity (MME) 18 that functions as a signaling controller for the LTE network. Further, the eNodeB 12 has a communication interface with a serving gateway (SGW) 20, which in turn has a communication interface with a packet-data network gateway (PGW) 22 that provides connectivity with a packet-switched network 24, and the MME has a communication interface with the SGW 20. In practice, the illustrated components of the LTE network may sit as nodes on a private packet-switched network owned by an operator of the LTE network, and thus the various communication interfaces may be logical interfaces through that network.

As illustrated, the air interface of coverage area 14 defines a downlink direction 26 from the eNodeB to the UE and an uplink direction 28 from the UE to the eNodeB. Further, the eNodeB and UE may be configured (e.g., licensed and programmed) to support air interface communication on various particular carriers, which may be FDD or TDD. Each such carrier and/or its particular downlink and uplink channels may be identified by one or more globally unique identifiers per industry standard, so that the eNodeB and a served UE can refer to particular carriers by those identifiers.

According to LTE, each carrier's downlink channel may then define various sub-channels, such as a physical downlink control channel (PDCCH) for carrying scheduling directives and other control signaling from the eNodeB to UEs, a physical downlink shared channel (PDSCH) for carrying scheduled downlink data communication, and a reference channel for carrying a reference signal that UEs can monitor to evaluate coverage quality. Likewise, each carrier's uplink channel may define various sub-channels, such as a physical uplink control channel (PUCCH) for carrying scheduling requests and other control signaling from the UEs to the eNodeB and a physical uplink shared channel (PUSCH) for carrying scheduled uplink data communication.

With this arrangement, when UE 16 enters into coverage of eNodeB 12, the UE may detect the eNodeB's coverage on a particular carrier, and the UE may engage in an attach process or handover process to register with the LTE network on that carrier. For instance, the UE may initially transmit to the eNodeB an attach request, which the eNodeB may pass along to the MME 18, triggering a process of authenticating the UE and establishment of one or more logical bearer connections for the UE between the eNodeB and the PGW 22.

Further, the UE may engage in signaling with the eNodeB to establish a radio-link-layer connection (i.e., air interface connection) on the detected carrier, so that the eNodeB may then serve the UE on that carrier. For instance, the UE and eNodeB may exchange radio resource control RRC configuration messaging in order to prepare the eNodeB to serve the UE on the carrier and to prepare the UE to be served on the carrier. In this process, the eNodeB may store a context record for the UE, indicating that the eNodeB is serving the UE on the particular carrier, so that the eNodeB may then serve the UE on the indicated carrier (e.g., then exchanging control signaling and bearer traffic with the UE on that carrier) per that context record. Further, the UE may store a context record indicating that the UE is being served on that carrier, so that the UE can then be served on that carrier (e.g., then exchanging control signaling and bearer traffic with the eNodeB on that carrier) per that context record. As such, the radio-link-layer connection could be considered to effectively encompass initially just that one carrier.

In addition, during this initial attach process and/or more likely later while serving the UE, the eNodeB and UE may engage in RRC configuration messaging and/or other processing to modify or otherwise set the UE's radio-link-layer connection to encompass a different number of carriers. In particular, the eNodeB and UE may arrange the UE's radio-link-layer connection to encompass two or more carriers so as to facilitate carrier aggregation service.

There could be various reasons for doing this. By way of example, the eNodeB may base this on a determination that a single carrier on which the UE would be served, such as the carrier on which the UE initially requested attachment and/or initially attached with the eNodeB, is threshold heavily loaded (e.g., that the eNodeB has been scheduling more than a threshold percentage of resources on that carrier, and/or that the eNodeB is serving more than a threshold number of UEs with radio-link-layer connections encompassing that carrier). Or the eNodeB m may base this on a determination that the air interface channel conditions between the UE and the eNodeB are threshold good and/or threshold poor (e.g., based on UE-provided channel-quality measurement reports and/or eNodeB evaluation of channel quality). Still further, the eNodeB may base this on a determination that there is a threshold great extent of data buffered for transmission over the air interface between the eNodeB and the UE.

To set or adjust the carriers encompassed by the UE's radio-link-layer connection, the eNodeB may transmit to the UE an RRC connection reconfiguration message that specifies the carriers on which the eNodeB will be serving the UE, identifying each carrier by its global identifier for instance. Further, to facilitate carrier aggregation service, the eNodeB may designate one such carrier by a special PCell index and the eNodeB may designate each other carrier by a special SCell index. The eNodeB may then also update its context record for the UE to indicate that the UE's radio-link-layer connection now encompasses the indicated carriers, so that the eNodeB may then engage in communication with the UE on those carriers. And the UE may responsively update its context record to indicate that the UE's radio-link-layer connection now encompasses the indicated carriers, so that the UE will be prepared to engage in communication with the eNodeB on those carriers.

This or another process could be used to add or remove one or more carriers from a UE's radio-link-layer connection. For example, if the connection currently encompasses just one carrier, the process could be used to change the connection to encompass a different carrier and/or to add one or more additional carriers (e.g., as SCells) so as to facilitate carrier aggregation service. As another example, if the connection currently encompasses two or more carriers, the process could be used to add one or more additional carriers to the connection so as to provide increased carrier aggregation, or to remove one or more carriers from the connection so as to provide reduced carrier aggregation or to switch to single-carrier service. Other examples are possible as well.

As noted above, the present disclosure provides for determining a type of content that will be communicated between the eNodeB and the UE and using that type of content as a basis to determine how many carriers the UE's radio-link-layer connection should encompass, and the disclosure then provides for modifying the UE's radio-link-layer connection to encompass the determined number of carriers. This process could be carried out by the eNodeB itself and/or by one or more other network entities, such as with portions of the analysis carried out by an entity outside of the eNodeB and the eNodeB then responsively working to modify the radio-link-layer connection. For simplicity, however, the process will be described here in a scenario where the eNodeB carries out all aspects of the process.

The process may begin in a scenario where the eNodeB is serving the UE in an RRC-connected mode. In that mode, as the eNodeB receives bearer data for the UE (e.g., from network 24 via PGW 22 and SGW 20), the eNodeB may allocate air interface resources within the UE's radio-link-layer connection to carry the data to the UE, and the eNodeB may transmit the data to the UE in accordance with the allocation. Further, as the UE has bearer data to transmit via network 24, the UE may transmit scheduling requests to the eNodeB, the eNodeB may allocate air interface resources in the UE's radio-link-layer connection to carry the data from the UE, and the UE may transmit the data to the eNodeB in accordance with the allocation (e.g., for forwarding via SGW 20 and PGW 22 onto network 24).

In this initial state, if the UE's radio-link-layer connection encompasses just one carrier, the signaling and bearer communication would occur on just that one carrier. For instance, the eNodeB may allocate PDSCH and/or PUSCH resources on the carrier to carry the bearer data and may transmit to the UE on a PDCCH of that carrier one or more DCI messages that specify the allocation, and the eNodeB and UE may communicate the data on the allocated resources. Whereas, if the UE's radio-link-layer connection encompasses multiple carriers and thus supports carrier aggregation service on those multiple carriers, the eNodeB may allocate PDSCH and/or PUSCH resources on the multiple carriers concurrently (e.g., distributing the data transmission among resources on the multiple carriers) and may transmit to the UE on a PDCCH of the PCell and perhaps also on a PDCCH of one or more SCells one or more DCI messages that specify the allocation, and the eNodeB and UE may communicate the data on the allocated resources.

In this way, the UE may engage in data communication with various servers or other entities (possibly even other end user devices) on or via network 24, with the communication passing through the UE's radio-link-layer connection and through SGW 20, PGW 24, and network 24. FIG. 1 depicts two examples of such entities as servers 30 and 32. These servers may take various forms and may be set to communicate data representing various different types of content. By way of example, a representative server might be a web server that communicates web content, an e-mail server that communicates e-mail content, a streaming video server that transmits streaming video content (e.g., movies and television shows), a game server that communicates game content, an Internet Multimedia Subsystem (IMS) that supports voice calling, and the like. As a specific example, server 30 might be a streaming video server that is operated by one streaming video service provider and that provides streaming video content, and server 32 might be another streaming video server that is operated by another streaming video service provider and that also provides streaming video content. Other examples are possible as well.

To facilitate communication between the UE and such entities, the UE and each entity may each have a network address such as an Internet Protocol (IP) address on network 24. The UE and the entity may thus transmit data to each other in the form of one or more IP data packets, each having a respective header segment specifying a source IP address and a destination IP address, and each having a respective payload segment carrying some or all of the data at issue. Further, when the UE and the entity communicate data representing content of a particular type, such as content associated with a particular application, each packet may further include a transport port number (e.g., a particular Transmission Control Protocol (TCP) port number or User Datagram Protocol (UDP) port number) associated with that content type and/or another designation of the type of content carried by the packet, to facilitate processing by corresponding program logic at the UE and/or at the entity.

The data carried in the payload segment of such packets may be a digitally encoded representation of particular content being communicated between the UE and the entity. Such content may itself be media content of some type, such as video content, web content, voice content, gaming content, or the like. Alternatively, the content may be signaling content, such as Session Initiation Protocol (SIP), Real-Time Streaming Protocol (RTSP), or Hypertext Transfer Protocol (HTTP) messages used for setting up or otherwise controlling certain media content transmission. Such signaling content may then also include data that specifies other type of content that will be communicated to or from the UE. For instance, SIP signaling could carry a Session Description Protocol (SDP) segment that designates a type of content to be communicated to or from the UE.

In accordance with the disclosure, the eNodeB may determine the type of content that will be communicated between the eNodeB and the UE in various ways. By way of example, the eNodeB may accomplish this based on deep packet inspection (DPI) of one or more packets passing to or from the UE, and/or based on various associated signaling or other data.

As an example of this, the eNodeB may read one or more such packets to determine a type of content being carried by such packet(s) and could consider that to be an indication of the type of content that will be communicated between the eNodeB and UE. For instance, the eNodeB could read from one or more such packets a network address of a remote entity with which the UE is communicating and/or a transport port number associated with the type of content, and the eNodeB could map the network address and/or port number to a particular type of content.

To do this, the eNodeB may include or have access to a table that maps various network addresses and/or port numbers to corresponding types of content (e.g., indicating for each network address one or more possible types of content, and further indicating for each port associated with data sent to or from that network address a corresponding type of content), and the eNodeB may be programmed to refer to that table to determine the type of content that will be communicated to or from the UE. Through this process, the eNodeB might thereby determine that such packet data is streaming video content from a particular provider, streaming video content from another particular provider, streaming video content generally, gaming content, voice content, web content, and/or various other types of content such as those noted above for instance.

As another example, the eNodeB could read the payload of one or more such packets and programmatically evaluate the data in the payload to project what type of content will be communicated between the eNodeB and UE. For instance, if the payload carries SIP signaling or the like, the eNodeB could read that signaling to determine an SDP-based indication of type of content that will communicated to or from the UE, again possibly a type such as one of those noted above. Other examples are possible as well.

In turn, based at least on the determined type of content that will be communicated between the eNodeB and the UE, (i) the eNodeB may make a decision to serve the UE with carrier aggregation and (ii) the eNodeB may determine how many component carriers to aggregate together in the carrier aggregation, such as whether to aggregate together two component carriers, three component carriers, or some other number of component carriers that is at least two. This decision to serve the UE with carrier aggregation and the determination of how many component carriers to aggregate could be based on additional factors as well (i.e., in additional to consideration of the determined type of content), such as considerations of load and/or of channel conditions as noted above (e.g., based on the amount of data to be transmitted over the air interface between the eNodeB and the UE, the level of load on each of one or more carriers, and/or the UE-reported quality of the air interface connection). Further, the specific component carriers that would be aggregated could take various forms and have various bandwidth, and could be contiguous or non-contiguous and inter-band and/or intra-band. For instance, the carriers could each be 20 MHz TDD carriers or other carriers including but not limited to those noted above.

To facilitate this, the eNodeB may include or have access to a table that maps various types of content to an indication of whether or not to apply carrier aggregation and further, if the indication is to apply carrier aggregation, to an indication of quantity of component carriers to aggregate together (and possibly to an indication of which specific component carriers to aggregate together), and the eNodeB may be programmed to refer to that table to decide whether to apply carrier aggregation and, if so, how many component carriers to aggregate. Such a table may, for instance, list various different providers' streaming video services and specify a respective quantity of component carriers (two or more) to aggregate together per each provider's streaming video service (e.g., two for one provider's service, and three for another provider's service), so that the eNodeB may determine a different quantity of component carriers to aggregate together depending on which provider's streaming video service would be delivering streaming video content to the UE. Further or alternatively, such a table might list other types of content with corresponding indications of quantity of component carriers to aggregate, and might designate some types of content with indications to not apply carrier aggregation and thus to use just a single carrier rather than multiple component carriers.

Through this process, if the eNodeB thereby decides to serve the UE with carrier aggregation, and if the UE's radio-link-layer connection does not currently encompass the determined quantity of component carriers, then the eNodeB may respond to that decision by modifying the radio-link-layer connection to encompass the determined quantity of component carriers. As noted above, the eNodeB may so modify the radio-link-layer connection by engaging in RRC connection messaging with the UE, with the eNodeB and UE updating their context records accordingly, by way of example. Thus, if, at the initiation of this process, the radio-link-layer connection encompasses just one carrier, the eNodeB could modify the radio-link-layer connection by adding one or more component carriers to attain the determined quantity. Alternatively, if the radio-link-layer connection initially encompasses a quantity of component carriers different than the determined quantity (e.g., if the eNodeB is already set to serve the UE with carrier aggregation), the eNodeB could change the radio-link-layer connection from that initial quantity to the determined quantity, by adding or removing one or more component carriers.

Figure 2:
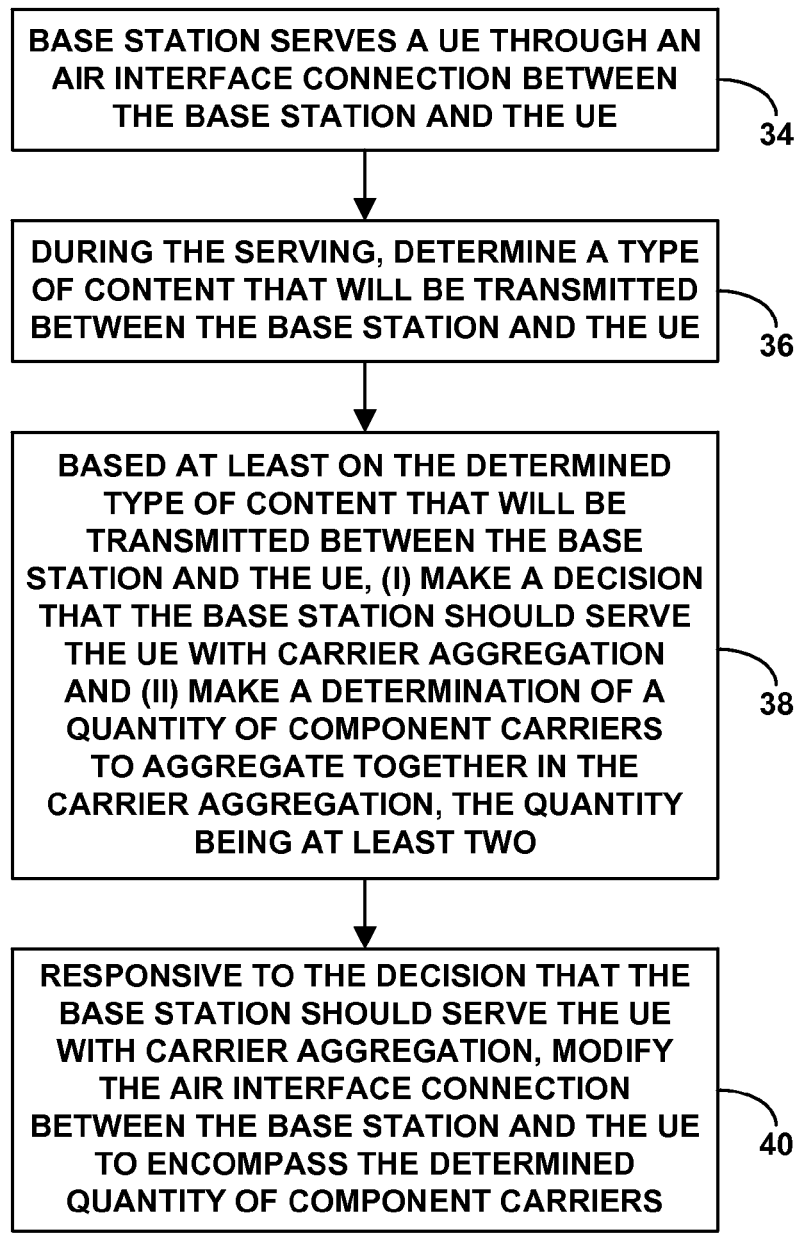
FIG. 2 is a flow chart depicting example operations in accordance with the disclosure.

FIG. 2 is next a flow chart depicting an example set of operations that can be carried out in an implementation of this process. As shown in FIG. 2, at block 34, the method begins with a base station serving a UE through an air interface connection between the base station and the UE (e.g., with the UE having an established radio-link-layer connection such as an RRC connection). At block 36, while the base station is so serving the UE, the method involves determining a type of content that will be transmitted between the base station and the UE. And at block 38, the method involves, based at least on the determined type of content that will be transmitted between the base station and the UE, (i) making a decision that the base station should serve the UE with carrier aggregation and (ii) making a determination of a quantity of component carriers to aggregate together in the carrier aggregation, the quantity being at least two. At block 40, the method then involves, responsive to the decision that the base station should serve the UE with carrier aggregation, modifying the air interface connection between the base station and the UE to encompass the determined quantity of component carriers.

Figure 3:
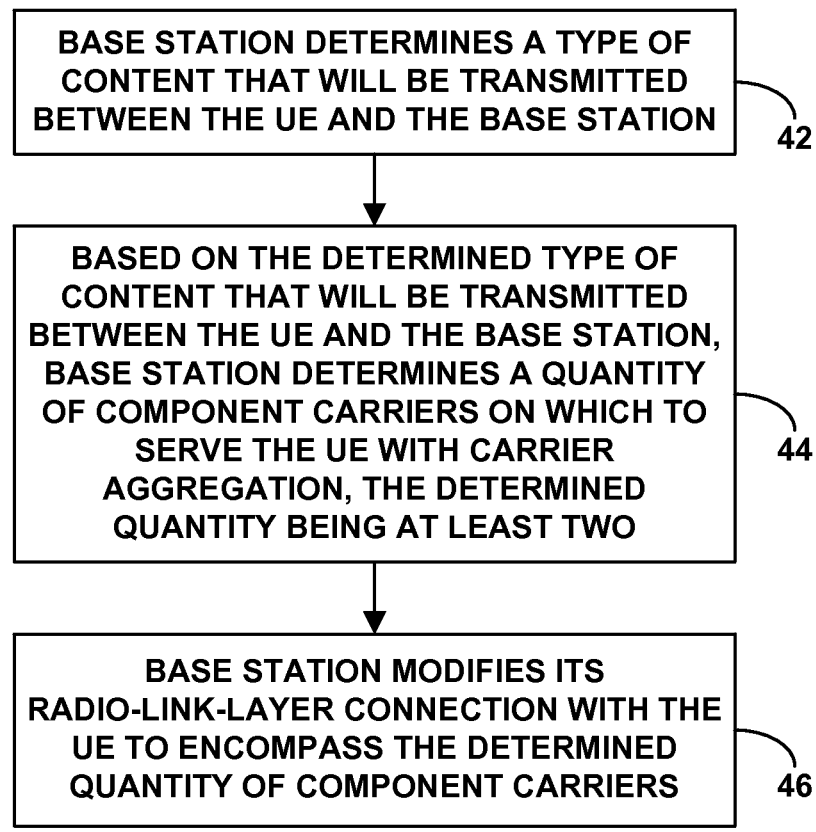
FIG. 3 is another flow chart depicting example operations in accordance with the disclosure.

FIG. 3 is next a flow chart depicting another example set of operations that can be carried out by a base station such as eNodeB 12 in an implementation of this process. In an example implementation, the illustrated process relates to a scenario where the base station has an established radio-link-layer connection with a UE served by the base station. As shown in FIG. 3, at block 42, the base station may then determine a type of content that will be transmitted between the UE and the base station. Further, at block 44, based on the determined type of content that will be transmitted between the UE and the base station, the base station may determine a quantity of component carriers on which to serve the UE with carrier aggregation, the determined quantity being at least two. And at block 46, the base station may then modify the radio-link-layer connection to encompass the determined quantity of component carriers, such as by adding to or removing from the radio-link-layer connection one or more carriers to attain the determined quantity as noted above. Various other features described above could be incorporated into this method as well.

Figure 4:
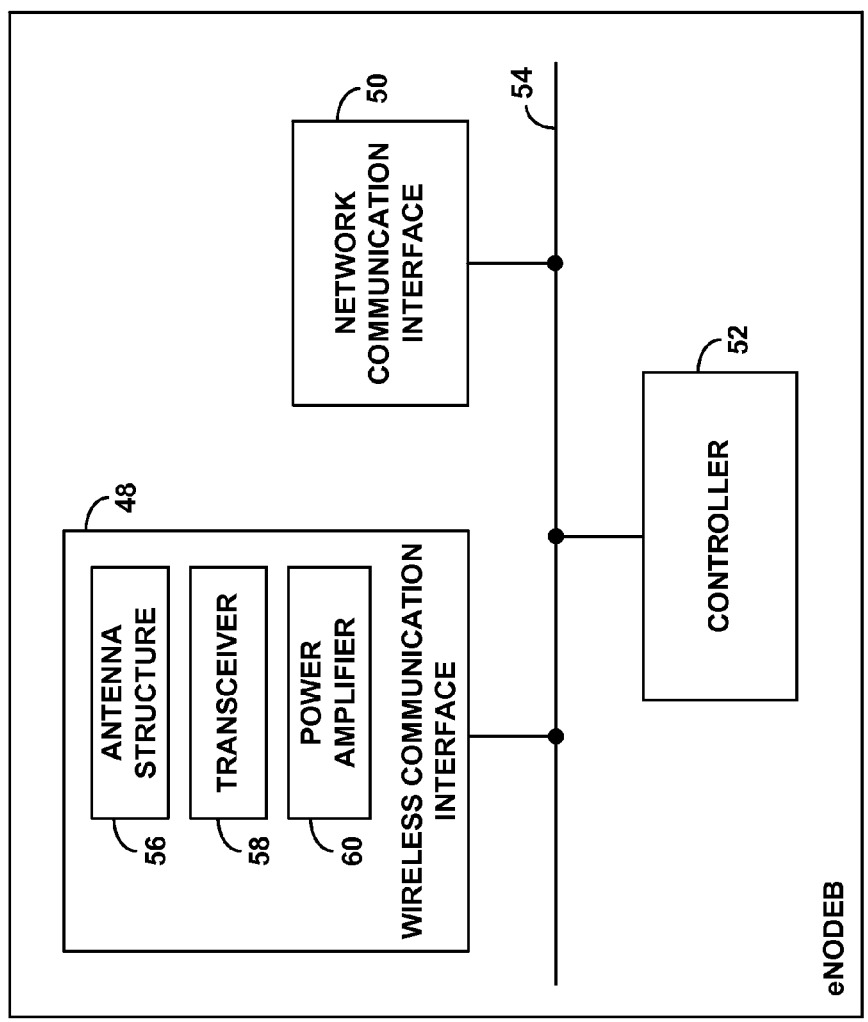
FIG. 4 is a simplified block diagram of an example base station operable in accordance with the disclosure.

Finally, FIG. 4 is a simplified block diagram of a base station of an example eNodeB (e.g., macro eNodeB, small cell, or other type of base station), showing some of the components that such a device may include in order to carry out these and other operations. As shown, the example eNodeB includes a wireless communication interface 48, a network communication interface 50, and a controller 52, all of which could be integrated together in various ways or, as shown, interconnected with each other through a system bus, network, or other connection mechanism 54.

Wireless communication interface 48 includes an antenna structure (e.g., one or more antennas or antenna elements) 56, which could be tower mounted or provided in some other manner, configured to transmit and receive over the air interface and thereby facilitate communication with served UEs. Further, the wireless communication interface includes a transceiver 58 and power amplifier 60 supporting air interface communication according to the LTE protocol. Network communication interface 50 may then comprise one or more wired and/or wireless network interfaces (such as an Ethernet interface) through which the base station may transmit and receive data over a backhaul connection with SGW 20 as discussed above.

Controller 52, which may be integrated with wireless communication interface 48 or with one or more other components of the eNodeB, may then be configured to manage communication over the air interface, including managing transmission of received data to a served UE one or multiple component carriers in the UE's radio-link-layer connection (e.g., LTE connection) in accordance with the present disclosure. By way of example, controller 44 may be configured to (i) identify, i.e., determine, a type of content that will be communicated between the base station and a UE served by the base station, (ii) make a decision based at least on the determined type of content that the base station should serve the UE with carrier aggregation, (iii) make a determination, based at least on the identified type of content, of a quantity of component carriers on which the base station should serve the UE with the carrier aggregation, and (iv) responsive to the decision and determination, modify a radio-link-layer connection between the base station and the UE to encompass the determined quantity of component carriers.

Controller 52 could be implemented using hardware, software, and/or firmware. For example, controller 52 could include one or more processors and a non-transitory computer readable medium (e.g., volatile and/or non-volatile memory) that stores machine language instructions or other executable instructions. The instructions, when executed by the one or more processors, may cause controller 52, and thus the eNodeB, to carry out the various base station operations described herein.

Exemplary embodiments have been described above. Those skilled in the art will understand, however, that changes and modifications may be made to these embodiments without departing from the true scope and spirit of the invention.

What is claimed is:

1. A method comprising:

serving, by a base station, a user equipment device (UE) through an air interface connection between the base station and the UE;

during the serving, determining a type of content that will be transmitted between the base station and the UE, wherein determining the type of content that will be transmitted between the base station and the UE comprises determining the type of content based on data within one or more data packets flowing to or from the UE, wherein the one or more data packets includes a network address of a remote entity, wherein determining the type of content based on data within the one or more data packets flowing to or from the UE comprises determining the type of content based at least on the network address, and wherein determining the type of content based at least on the network address comprises referring to a table that maps network addresses with types of content;

based at least on the determined type of content that will be transmitted between the base station and the UE, (i) making a decision that the base station should serve the UE with carrier aggregation and (ii) making a determination of a quantity of component carriers to aggregate together in the carrier aggregation, wherein the quantity is at least two; and responsive to the decision that the base station should serve the UE with carrier aggregation, modifying the air interface connection between the base station and the UE to encompass the determined quantity of component carriers.

2. The method of claim 1, wherein the one or more data packets further includes a transport port number, and wherein determining the type of content based on data within the one or more data packets flowing to or from the UE comprises determining the type of content based further on the transport port number.

3. The method of claim 1, wherein the one or more data packets carries a descriptor of the type of content, and wherein determining the type of content based on data within the one or more data packets flowing to or from the UE comprises determining the type of content based at least on the descriptor.

4. The method of claim 1, wherein making the determination, based at least on the determined type of content, of the quantity of component carriers to aggregate together in the carrier aggregation comprises referring to mapping data that correlates each of various types of content with a respective quantity of component carriers to determine based on the determined type of content the respective quantity of component carriers.

5. The method of claim 1, wherein the air interface connection initially encompasses just one carrier, and wherein modifying the air interface connection comprises changing the air interface connection from encompassing just the one carrier to encompassing the determined quantity of component carriers.

6. The method of claim 1, wherein the air interface connection initially encompasses an initial quantity of component carriers different from the determined quantity, and wherein modifying the air interface connection comprises changing the air interface connection from encompassing the initial quantity of component carriers to encompassing the determined quantity of component carriers.

7. The method of claim 1, wherein making the determination of the quantity of component carriers to aggregate together in the carrier aggregation comprises determining whether to aggregate together two component carriers or rather a number of component carriers more than two.

8. The method of claim 1, wherein modifying the air interface connection comprises (i) transmitting from the base station to the UE a radio-resource-control (RRC) configuration message that specifies each component carrier of the determined quantity of component carriers, whereby the transmitted RRC configuration message notifies the UE that air interface communication between the base station and the UE will occur on the specified component carriers, and (ii) updating a UE context record at the base station to indicate that the air interface connection encompasses the component carriers of the determined quantity, whereby the base station and UE are then set to communicate with each other on the component carriers of the determined quantity of component carriers.

9. The method of claim 1, wherein each component carrier of the quantity of component carriers is a 20 MHz time division duplex (TDD) carrier.

10. The method of claim 1, further comprising basing one or both of the decision that the base station should serve the UE with carrier aggregation and the determination of the quantity of component carriers to aggregate together in the carrier aggregation on at least one factor selected from the group consisting of (i) amount of data to be transmitted over the air interface between the base station and the UE and (ii) level of load on each of one or more carriers, and (iii) UE-reported quality of the air interface connection.

11. The method of claim 1, wherein at least the determining of the type of content, making of the decision that the base station should serve the UE with carrier aggregation, and making of the determination of the quantity of component carriers to aggregate together in the carrier aggregation are all carried out by the base station.

12. In a base station having an established radio-link-layer connection with a user equipment device (UE) served by the base station, a method comprising:
   determining a type of content that will be transmitted between the UE and the base station, wherein determining the type of content that will be transmitted between the base station and the UE comprises determining the type of content based on data within one or more data packets flowing to or from the UE, wherein the one or more data packets includes a network address of a remote entity, wherein determining the type of content based on data within the one or more data packets flowing to or from the UE comprises determining the type of content based at least on the network address, and wherein determining the type of content based at least on the network address comprises referring to a table that maps network addresses with types of content;
   based at least on the determined type of content that will be transmitted between the UE and the base station, determining a quantity of component carriers on which to serve the UE with carrier aggregation, wherein the determined quantity is at least two; and
   modifying the radio-link-layer connection to encompass the determined quantity of component carriers.

13. The method of claim 12, further comprising:
   based on the determined type of content, deciding to serve the UE with carrier aggregation.

14. The method of claim 12, wherein modifying the air interface connection comprises (i) transmitting from the base station to the UE a radio-resource-control (RRC) configuration message that specifies each component carrier of the determined quantity of component carriers, whereby the transmitted RRC configuration message notifies the UE that air interface communication between the base station and the UE will occur on the specified component carriers, and (ii) updating a UE context record at the base station to indicate that the air interface connection encompasses the component carriers of the determined quantity,
   whereby the base station and UE are then set to communicate with each other on the component carriers of the determined quantity of component carriers.

15. A base station comprising:
   an antenna structure for communicating over a radio-frequency air interface; and
   a controller configured to manage communication via the antenna structure over the air interface,
   wherein the controller is configured to (i) determine a type of content that will be communicated between the base station and a user equipment device (UE) served by the base station, wherein determining the type of content that will be communicated between the base station and the UE comprises determining the type of content based on data within one or more data packets flowing to or from the UE, wherein the one or more data packets includes a network address of a remote entity, wherein determining the type of content based on data within the one or more data packets flowing to or from the UE comprises determining the type of content based at least on the network address, and wherein determining the type of content based at least on the network address comprises referring to a mapping between network addresses and types of content, (ii) make a decision based at least on the determined type of content that the base station should serve the UE with carrier aggregation, (iii) make a determination, based at least on the identified type of content, of a quantity of component carriers on which the base station should serve the UE with the carrier aggregation, and (iv) responsive to the decision and determination, modify a radio-link-layer connection between the base station and the UE to encompass the determined quantity of component carriers.

16. The base station of claim 15, wherein modifying the radio-link-layer connection comprises (i) causing the base station to transmit to the UE a radio-resource-control (RRC) configuration message that specifies each component carrier of the determined quantity of component carriers, whereby the transmitted RRC configuration message notifies the UE that air interface communication between the base station and the UE will occur on the specified component carriers, and (ii) updating a UE context record at the base station to indicate that the radio-link-layer connection encompasses the component carriers of the determined quantity.

* * * * *